No. 799,379. PATENTED SEPT. 12, 1905.
A. HEISTERKAMP.
SHADE ROLLER BRACKET.
APPLICATION FILED MAY 3, 1905.
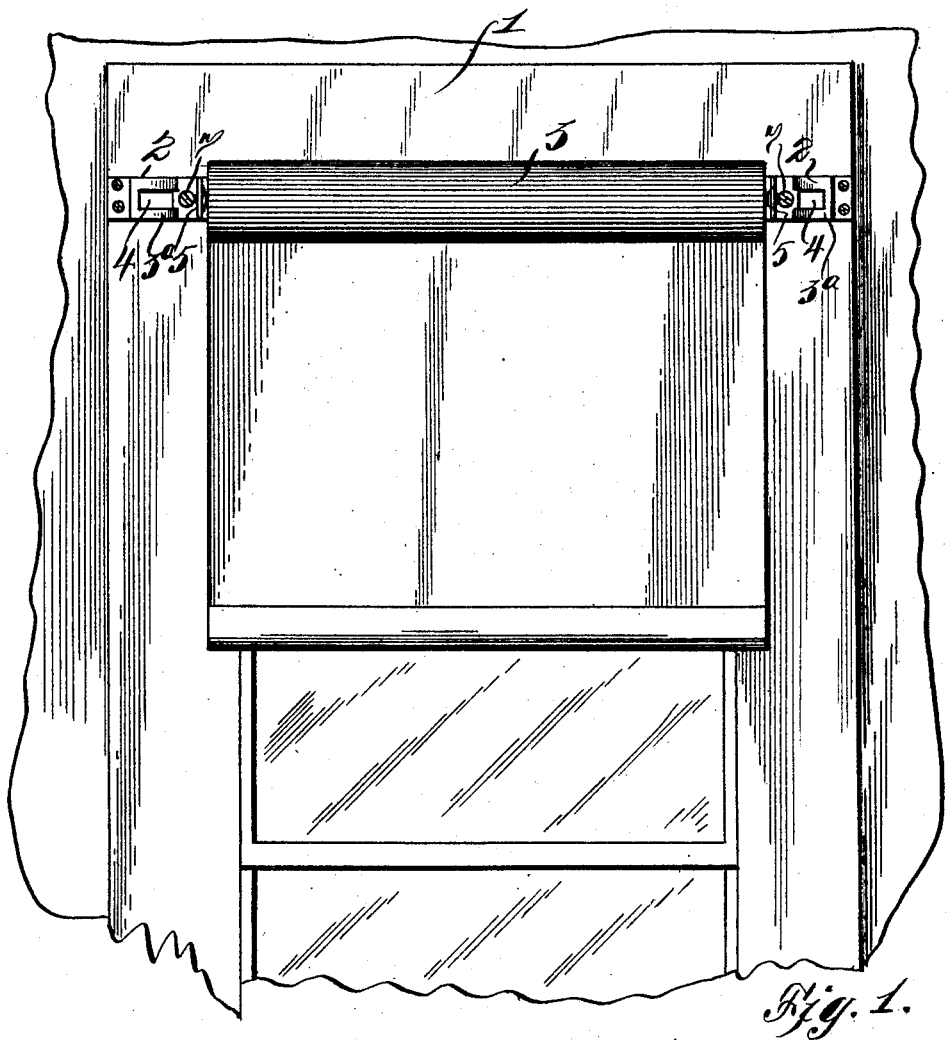
Fig. 1.
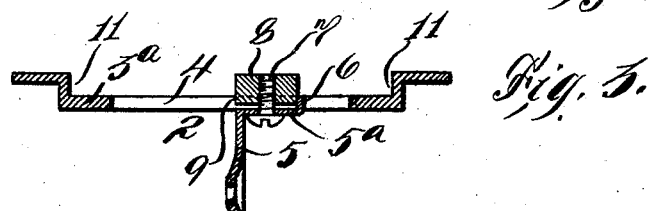
Fig. 3.
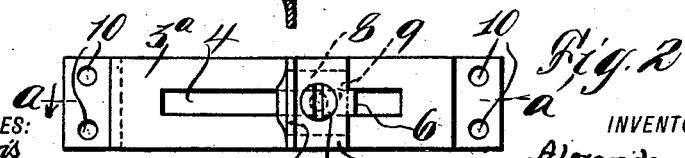
Fig. 2.
Fig. 4.
WITNESSES:
E. A. Jarvis
Haskel Coventhal
INVENTOR
Alexander Heisterkamp
BY Maurice Block
his ATTORNEY.

UNITED STATES PATENT OFFICE.

ALEXANDER HEISTERKAMP, OF HOBOKEN, NEW JERSEY.

SHADE-ROLLER BRACKET.

No. 799,379.  Specification of Letters Patent.  Patented Sept. 12, 1905.

Application filed May 3, 1905. Serial No. 258,567.

*To all whom it may concern:*

Be it known that I, ALEXANDER HEISTERKAMP, a resident of Hoboken, Hudson county, State of New Jersey, have invented certain new and useful Improvements in Shade-Roller Brackets, of which the following is a specification.

My invention relates to window-shade-roller brackets, but may be used for any similar purpose, the object being to provide a simple and inexpensive device of this character which will be adjustable, whereby shades or the like of different widths may be accommodated.

Reference is to be had to the accompanying drawings, forming part of this specification, wherein—

Figure 1 illustrates a front elevation of a window, window-shade, and adjustable brackets embodying my invention applied thereto. Fig. 2 is an enlarged plan view of my improved adjustable bracket. Fig. 3 is a longitudinal section thereof, the section being taken on a line $a\ a$ in Fig. 2; and Fig. 4 is an enlarged detail perspective view of the nut which secures the roller-support in place.

Like numerals of reference indicate corresponding parts in the several views.

Referring to the accompanying drawings, 1 indicates a window-casing of any suitable design upon which my improved brackets 2 2 are secured, said brackets supporting an ordinary curtain and roller 3. Brackets 2 2 are composed of a support or plate $3^a$, in which a longitudinal slot 4 is provided. Upon the outer side of said support $3^a$ a roller bracket or bearing 5 is secured, said bracket 5 being provided with a base $5^a$, having a tongue 6 integral therewith, the tongue 6 projecting within the slot 4 and having for its object to keep the bracket 5 in alinement or, in other words, to prevent the bracket 5 from any tendency to rotate while being adjusted, and thereby acting to bind upon the shade-roller spindle. To secure the bracket 5 firmly in place, I employ a bolt or screw 7, which passes through the base $5^a$ of said bracket and through the slot 4 and into a nut 8 upon the under or inner side of the support $3^a$. The nut 8 is provided with a projection 9, which fits within the slot 4, as shown in Fig. 3, for the purpose of preventing the rotation of the nut when the screw 7 is being loosened or tightened. The support $3^a$ is secured to the casing 1 by means of screws which pass through holes 10. The support $3^a$ is offset at 11 in order to keep the nut 8 away from the casing.

By loosening the screw 7 with a screwdriver, the nut 8 being held against rotation by the projection 9 and the bracket 5 by the tongue 6, said bracket can be adjusted in either direction to accommodate a long or short shade-roller.

It will of course be understood that the brackets 5 may be of the usual construction as to openings or bearings, one having a hole therein and the other a slot.

Having now described my invention, what I claim, and desire to secure by Letters Patent, is—

In a shade-roller bracket, the combination of a support having a longitudinal slot therein, an adjustable bracket upon said support, a tongue integral with said bracket and adapted to enter said slot, a screw or bolt loosely mounted upon said bracket and adapted to pass through said slot, and a nut carried by said screw, the nut being provided with a projection integral therewith which is adapted to enter said slot and prevent rotation of the nut when the screw is operated.

ALEXANDER HEISTERKAMP.

Witnesses:
HASKEL CORENTHAL,
DANL. HERSHFIELD.